US008495548B2

(12) United States Patent
Agarwal et al.

(10) Patent No.: US 8,495,548 B2
(45) Date of Patent: Jul. 23, 2013

(54) MULTI-PATTERNING LITHOGRAPHY AWARE CELL PLACEMENT IN INTEGRATED CIRCUIT DESIGN

(75) Inventors: Kanak Behari Agarwal, Austin, TX (US); Charles Jay Alpert, Austin, TX (US); Zhuo Li, Austin, TX (US); Gi-Joon Nam, Austin, TX (US); Natarajan Viswanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/248,711

(22) Filed: Sep. 29, 2011

(65) Prior Publication Data
US 2013/0086543 A1 Apr. 4, 2013

(51) Int. Cl.
*G06F 17/50* (2006.01)

(52) U.S. Cl.
USPC ............ 716/122; 716/110; 716/118; 716/119

(58) Field of Classification Search
USPC .......................................................... 716/122
See application file for complete search history.

(56) References Cited

U.S. PATENT DOCUMENTS

| 7,802,226 | B2 | 9/2010 | Park et al. | |
|---|---|---|---|---|
| 2005/0166169 | A1* | 7/2005 | Kurzum et al. | 716/10 |
| 2010/0229145 | A1 | 9/2010 | Sahouria et al. | |
| 2011/0078638 | A1 | 3/2011 | Kahng et al. | |

OTHER PUBLICATIONS

Gupta, Mohit et al. "Timing Yield-Aware Color Reassignment and Detailed Placement Perturbation for Double Patterning Lithography", Nov. 2-5, 2009, ICCAD '09, pp. 607-614.*
U.S. Appl. No. 12/796,501, filed Aug. 8, 1905, Courtnay.
U.S. Appl. No. 13/016,033, filed Nov. 4, 1856, Wardwell et al.
T. Taghavi et al., "New placement prediction and mitigation techniques for local routing congestion." 2010 IEEE/ACM International Conference on Computer-Aided Design (ICCAD), Nov. 7-11, 2010, pp. 621-624.
M. Gupta et al., "Timing Yield-Aware Color Reassignment and Detailed Placement Perturbation for Bimodal CD Distribution in Double Patterning Lithography," IEEE Transactions on Computer-Aided Design of Integrated Circuits and Systems, vol. 29, Issue 8, Aug. 2010, pp. 1229-1242.
K. Yuan et al., "Double Patterning Layout Decomposition for Simultaneous Conflict and Stitch Minimization," IEEE Transactions on Computer-Aided Design of Integrated Circuits and Systems, vol. 29, Issue 2, Feb. 2010, pp. 185-196.

(Continued)

*Primary Examiner* — Paul Dinh
*Assistant Examiner* — Bryce Aisaka
(74) *Attorney, Agent, or Firm* — Garg Law Firm, PLLC; Rakesh Garg; Libby Z. Toub

(57) ABSTRACT

A method, system, and computer program product for multi-patterning lithography (MPL) aware cell placement in integrated circuit (IC) design are provided in the illustrative embodiments. A global phase of cell movement is performed. A local phase cell movement is performed, wherein the local phase includes moving a color instance of the cell from a plurality of color instances of the cell within a row of cell in the IC design, wherein the global phase and the local phase are each performed before a final placement is produced for the IC design.

20 Claims, 10 Drawing Sheets

OTHER PUBLICATIONS

L. Liebmann et al., "Taming the final frontier of optical lithography: Design for sub-resolution patterning," Proceedings of the SPIE, vol. 7641, 210, pp. 764105-1-764105-11.

A. B. Kahng et al., "Layout Decomposition Approaches for Double Patterning Lithography," IEEE Transactions on Computer-Aided Design of Integrated Circuits and Systems, vol. 29, Issue 6, Jun. 2010, pp. 939-952.

T.-B. Chiou et al., "Development of layout split algorithms and printability evaluation for double patterning technology," Proceedings of the SPIE, vol. 6924, 2008, pp. 69243M-1-69243M-10.

T. Taghavi et al., "New placement prediction and mitigation techniques for local routing congestion." 2010 IEEE/ACM International Conference on Computer-Aided Design (ICCAD), Nov. 2010—resubmission.

* cited by examiner

FIG. 3
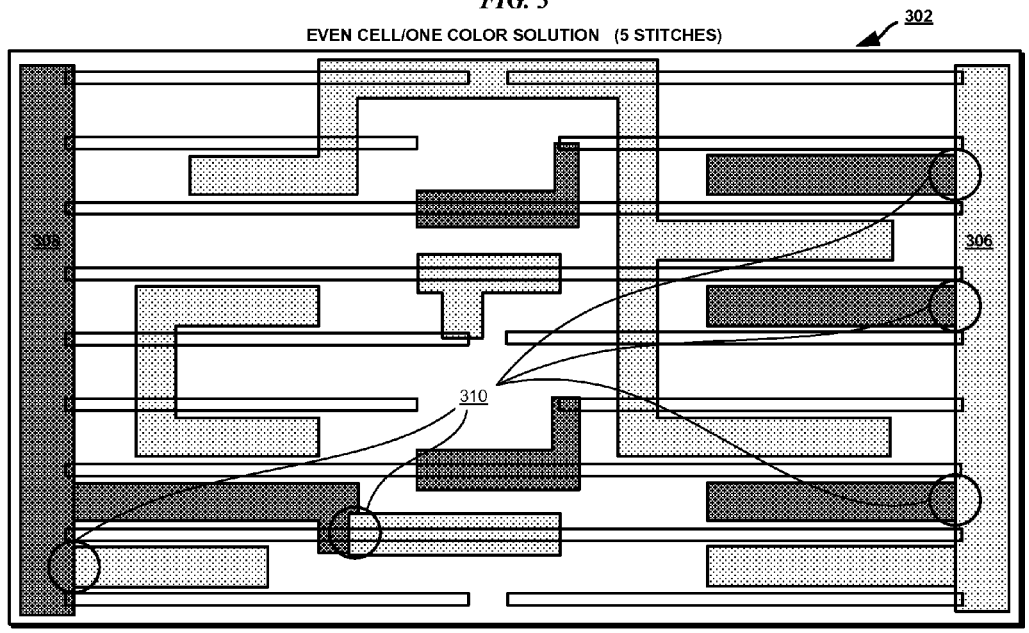
EVEN CELL/ONE COLOR SOLUTION (5 STITCHES)
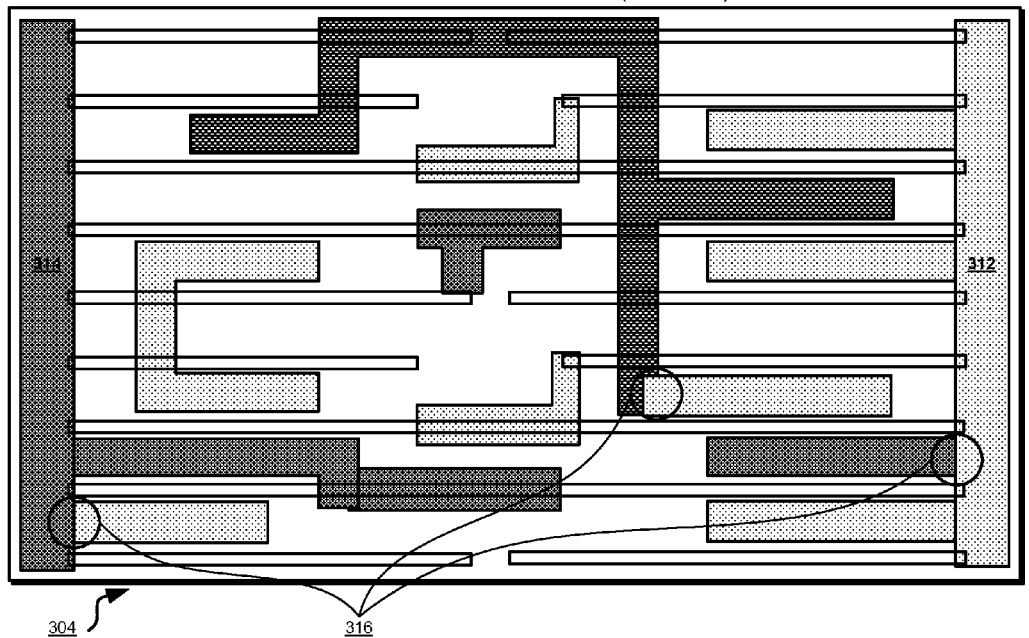
ODD CELL/OTHER COLOR SOLUTION (3 STITCHES)

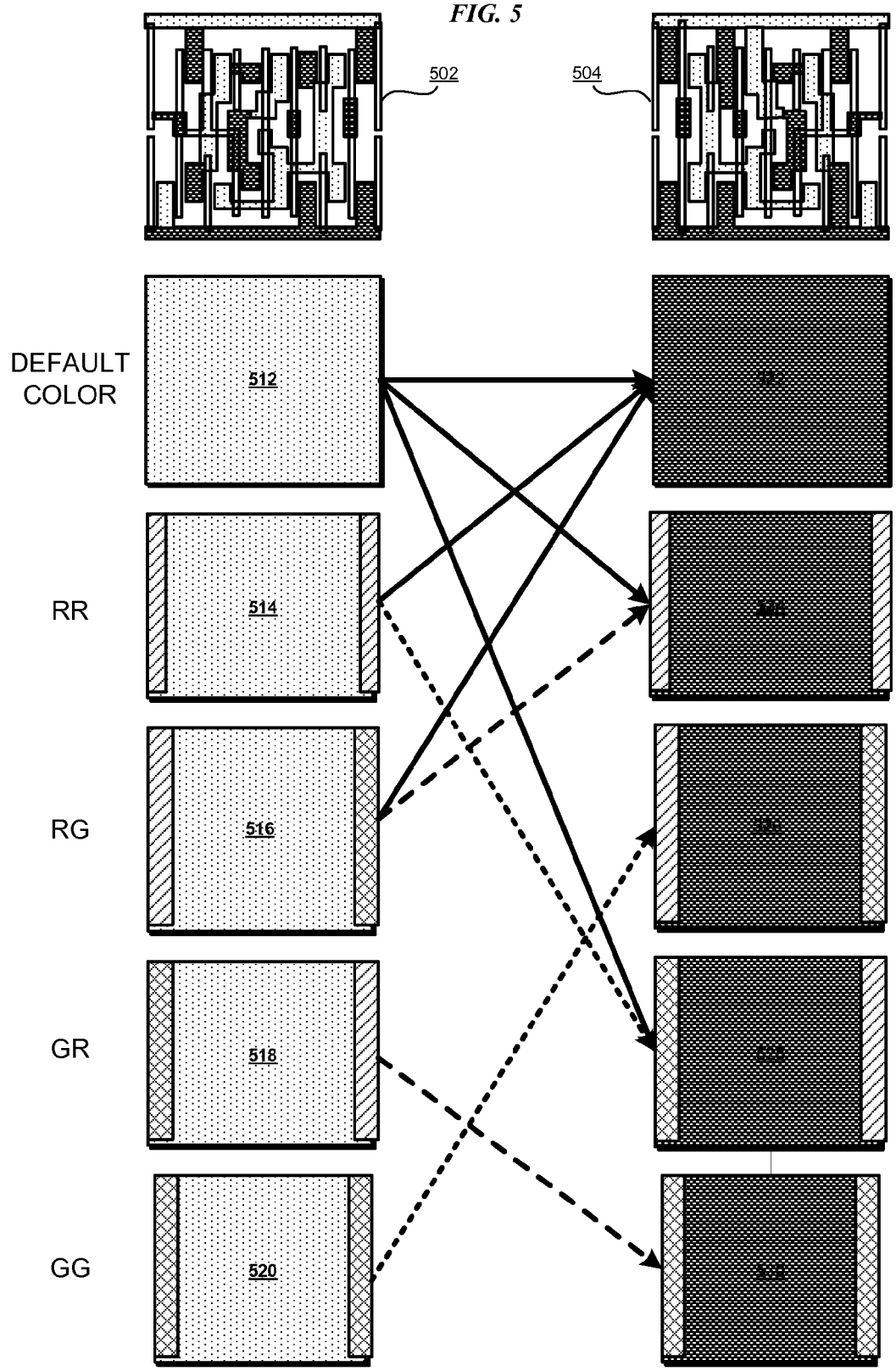

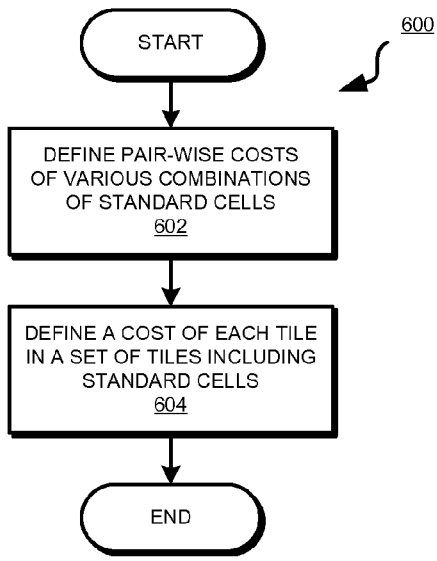
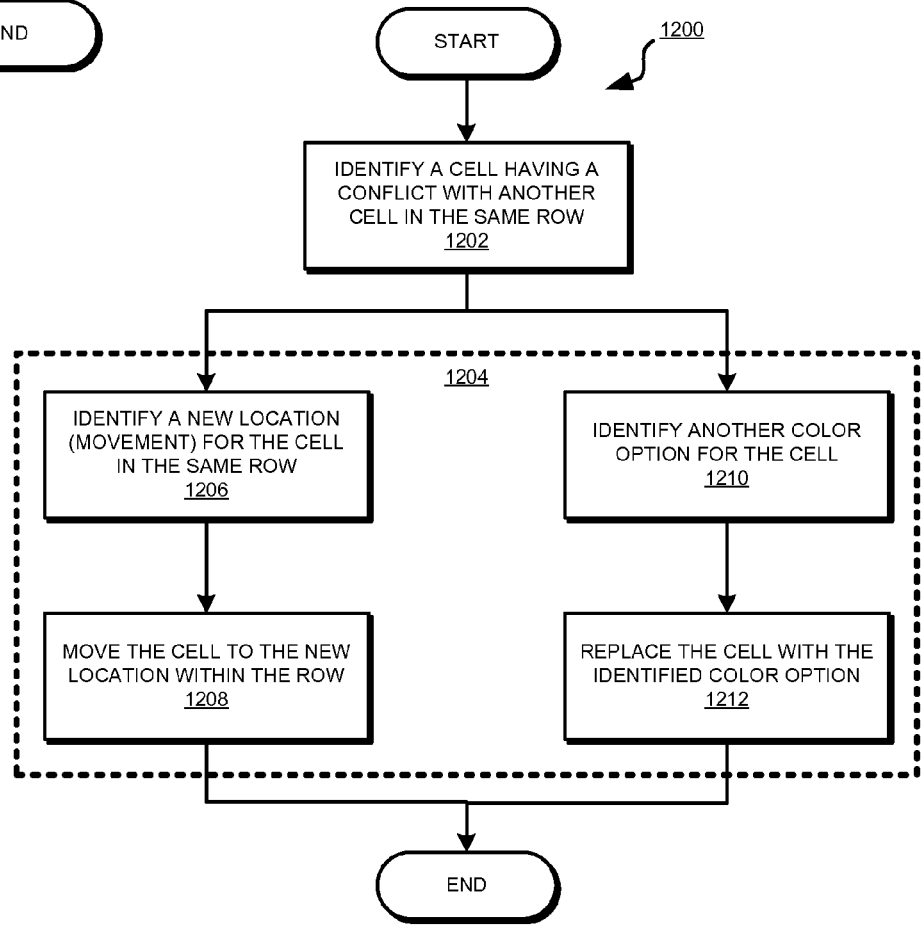

*FIG. 10B*

ALGORITHM FOR ROW BASED CELL
SPACING OPTIMIZATION PROBLEM 1050

▷ Input: Cells $C_1$ to $C_n$ in a row from $0$ to $L$
▷ Output: Displacement $d_i$ for each cell $C_i$
1  $t_1(d_1) = 0, d_1 = -M$ to $M$
2  $t_i(d_i) = \infty, i = 2$ to $n, d_i = -M$ to $M$
3  for Cell $C_i, i = 2$ to $n$
4      $N = -M$
5      for $d_i = -M$ to $M$
6          for $d_{i-1} = N$ to $M$
7              $y = \max(t_{i-1}(d_{i-1}), F_{i-1}(d_{i-1}, d_i))$
8              if$(y < t_i(d_i))$ then $t_i(d_i) = y$,
9                          $\gamma_i(d_i) = d_{i-1}$,
10                         $N = d_{i-1}$
11             if$(F_{i-1}(d_{i-1}, d_i) > t_{i-1}(d_{i-1}))$ then break
12 $F_{max} = \infty, q = 0$
13 for $d_n = -M$ to $M$
14     if$(t_n(d_n) < F_{max})$ then $F_{max} = t_n(d_n), q = d_n$
15 $d_n = q$
16 for $i = n$ downto $2$
17     $d_{i-1} = \gamma_i(d_i)$

MULTI-PATTERNING LITHOGRAPHY AWARE CELL PLACEMENT IN INTEGRATED CIRCUIT DESIGN

RELATED APPLICATION

The present invention is related to similar subject matter of co-pending and commonly assigned U.S. patent application Ser. No. 12/796,501 entitled "DETAILED ROUTABILITY BY CELL PLACEMENT," filed on Jun. 8, 2010, and U.S. patent application Ser. No. 12/796,550 entitled "POST-PLACEMENT CELL SHIFTING," filed on Jun. 8, 2010, which are hereby incorporated by reference.

BACKGROUND

1. Technical Field

The present invention relates generally to a method, system, and computer program product for designing an integrated circuit. More particularly, the present invention relates to a method, system, and computer program product for multi-patterning lithography (MPL) aware cell placement in integrated circuit (IC) design.

2. Description of the Related Art

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

Once a design layout (layout) has been finalized for an IC, the design is converted into a set of masks or reticles. A set of masks or reticles is one or more masks or reticles. During manufacturing, a semiconductor wafer is exposed to light or radiation through a mask to form microscopic components of the IC. This process is known as photolithography (lithography).

A manufacturing mask is a mask usable for successfully manufacturing or printing the contents, of the IC design onto the wafer. During the printing process, radiation is focused at certain desired intensity of the radiation through the mask. This intensity of the radiation is commonly referred to as "dose". The focus and the dosing of the radiation have to be precisely controlled to achieve the desired shape and electrical characteristics on the wafer.

Logical synthesis, physical synthesis, and generation of a routed and timing-closed design are some of the functions of an IC design software tool. Logical synthesis is the process of designing the logical operation that is to be achieved by a circuit. Physical synthesis is the mapping, translating, or integration of that logical synthesis to the physical design components, such as logic gate and buffer circuits. Routing and timing-closed design is the design produced by adjusting the wire routings and component placements in a design so that the design meets certain design criteria such as delay or slew of signals, or wirelength restrictions.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry. An interconnected group of components is called a net.

The software tools manipulate these components at the components level, or blocks of components level. A block of components is also known as a global cell, or g-cell. A g-cell in an IC design is a portion of the IC design. One way of identifying g-cells in an IC design is to overlay a grid of imaginary vertical and horizontal lines on the design, and deeming each portion of the IC design bound by horizontal and vertical lines as a g-cell. The horizontal or vertical lines bounding a g-cell are called cut-lines. A g-cell is also known as a tile.

Imposing such a grid on an IC design abstracts the global routing problem away from the actual wire implementation and gives a more mathematical representation of the task. A net may span one or more g-Cells and may cross several cut lines.

An IC design software tool can, among other functions, manipulate cells, or interconnect components of one cell with components of other cells, such as to form nets. These cells are different from g-cells in that these cells are the actual logic components, such as the semiconductor gates.

The interconnects between components are called wires. A wire is a connection between parts of electronic components, and is formed using a metallic material that conducts electricity.

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement.

A wire can be designed to take any one of the several available paths in a design. Placement of a wire on a certain path, or track, is a part of routing.

A router is a component of an IC design tool that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into g-cells and attempts to route nets through the g-cells such that no g-cell overflows its capacity. Global routing is the process of connecting a g-cell to other g-cells.

After global routing, wires must be assigned to actual tracks within each tile, followed by detail routing, which must connect each global route to the actual pin shape on the cell. Another type of router—known as the detailed router—performs the detailed routing. The global and detailed routing produced during the design process is collectively referred to as "routing" and is usually further modified during optimization of the design.

SUMMARY

The illustrative embodiments provide a method, system, and computer program product for multi-patterning lithography aware cell placement in integrated circuit design. An embodiment performs a global phase of cell movement. The embodiment performs a local phase cell movement, wherein the local phase includes moving a color instance of the cell from a plurality of color instances of the cell within a row of cell in the IC design, wherein the global phase and the local phase are each performed before a final placement is produced for the IC design.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a block diagram of an example double-patterned cell, which can be placed using an illustrative embodiment;

FIG. 5 depicts a block diagram of a pair-wise cost model that can be used in a placement tool to perform MPL-aware cell placements in accordance with an illustrative embodiment;

FIG. 6 depicts a flowchart of a process of defining the various costs to be considered in MPL-aware placement in accordance with an illustrative embodiment;

FIG. 10B depicts a pseudo code of a smart pruning algorithm of reduced complexity in accordance with an illustrative embodiment;

FIG. 12 depicts a flowchart of a process of the local phase of the MPL-aware placement in accordance with an illustrative embodiment.

DETAILED DESCRIPTION

Figure 1:
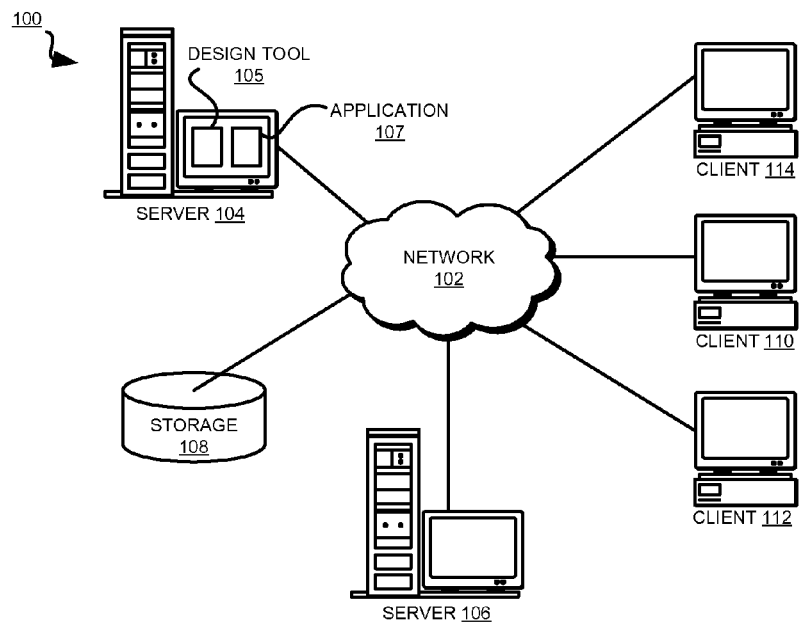
FIG. 1 depicts a pictorial representation of a network of data processing systems in which illustrative embodiments may be implemented.

The IC designs are becoming increasingly complex, the number of components per design is increasing, and the size of components being printed is shrinking. The IC design process is being geared for producing components where the size of the components and inter-component spacing are fifteen (15) nanometer (nm) or less across. To give some perspective on the size of the components, the wavelength of the light used for lithography is approximately one hundred and ninety three (193) nm.

Multi-patterning lithography is a method to make sure the geometry printed on wafer has similar shapes and electrical properties as drawn on the mask, such as for the fifteen nm and smaller design technology, where a single mask is not sufficient to guarantee the printability of the design. Generally in MPL, the cells in the design are colored in different colors, each color forming a pattern and representing one exposure. In so dividing the shapes in the cells into different colors, the colored masks become more printable as the shapes of the same color form only a part of the cell and are much farther apart as compared to when all the shapes are printed simultaneously.

Double patterning lithography (DPL) is a variation of MPL where cells are colored using two colors. For example, the components or shapes in a cell that may be colored red are printed in one iteration of lithography, and the components or shapes in the cell that may be colored green are printed in another iteration of lithography. When a shape is broken up such that a part of the shape is of one color, and another part of the shape is of another color, the process of fabricating the complete shape in two or more iterations of lithography is called "stitching."

The embodiments are described herein using DPL examples only for the clarity of the disclosure and not as a limitation on the embodiments. A problem recognized by an embodiment in presently available DPL technology is also recognized by the embodiments in the presently available MPL technology. Using this disclosure, an embodiment can be implemented in a DPL implementation as well as in an MPL implementation within the scope of the embodiments.

The embodiments of the invention recognize that presently available MPL/DPL methods are limited to ensuring that the colored designs of the cells in the design library are correct, and that the number of stitches needed for a given cell in the library is minimized. Furthermore, the embodiments recognize that presently available MPL/DPL methodologies are focused on the coloring related problems within a cell, that is intra-cell coloring problems, and not on the coloring related problems between different cells, that is inter-cell coloring problems, in a design.

For example, the embodiments recognize that the presently available MPL/DPL methodologies merely attempt to remove conflict between colored shaped within a cell through coloring algorithm or with stitches. The embodiments further recognize that presently, when a design is placed, and inter-cell color conflicts are encountered during routing or later stages, simple approaches to remedy the conflict just move the conflicting cells away from each other.

The embodiments recognize that such a simplistic post-placement solution results in an increased area of the design, which is an undesirable outcome of the solution. The embodiments also recognize that double patterning the entire design so that no post-placement conflicts exist is impractical. For example, a typical IC design may include tens of millions of cells; double patterning such a design is computationally intensive, cost prohibitive and impracticable for the computation time such an exercise will require.

The illustrative embodiments used to describe the invention generally address and solve the above-described problems and other problems related to DPL and MPL. The illustrative embodiments provide a method, system, and computer program product for MPL-aware cell placement in IC design.

While some embodiments are described with respect to DPL, an implementation may use an embodiment with respect to any number of patterns in MPL without departing the scope of the invention. For example, an implementation may find a desirable placement solution using three or four color patterned cells in the manner of an embodiment without departing the scope of the invention.

The illustrative embodiments are described with respect to certain ICs or circuits only as examples. Such descriptions are not intended to be limiting on the invention. For example, an illustrative embodiment described with respect to a microprocessor design can be implemented with respect to a design of a memory whose placement can be made MPL-aware by using an embodiment.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
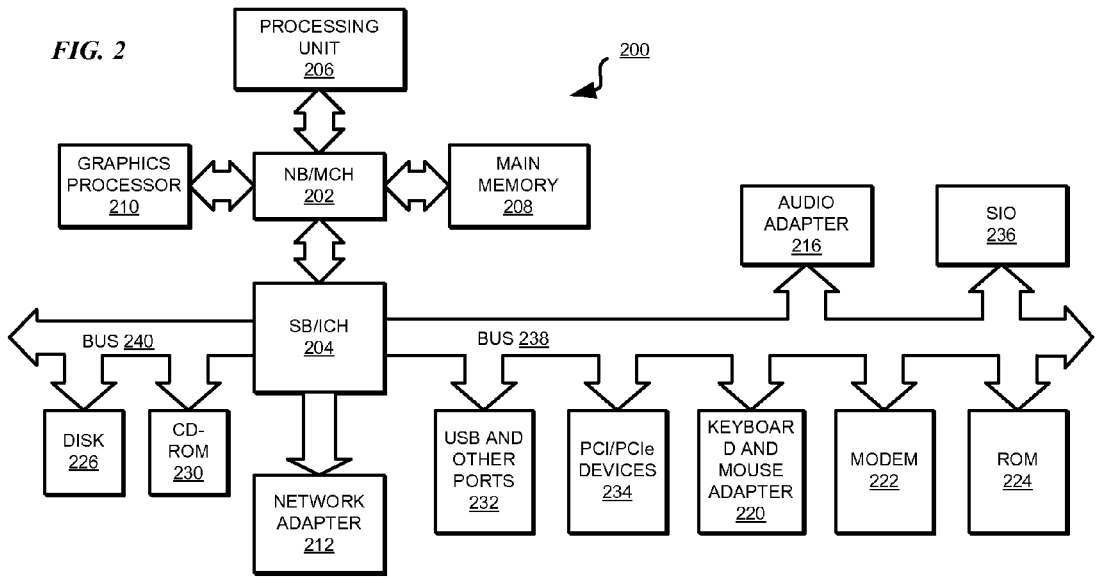
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include design tool 105 that may be improved using an embodiment. Design tool 105 may be any suitable software application for designing ICs. Application 107 may be any combination of hardware and software usable for implementing an embodiment of the invention such that the embodiment is usable with design tool 105 for MPL-aware placement.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used far implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (BATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise-one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an example double-patterned cell, which can be placed using an illustrative embodiment. Cells 302 and 304 may be two differently colored versions of the same standard cell in a cell library of design tool 105 in FIG. 1. A standard cell is any cell that provides a functionality commonly used in IC design, such that when that functionality is required in an IC design, the functionality need not be engineered from scratch but instead, the standard cell can be incorporated into the design.

Cell 302 may be referred to as an even cell, and cell 304 may be referred to as an odd cell, the even and odd cells referring to the same cell and having the same functionality in the cell library.

A cell's rectangular shape is bound by four edges. In a typical design, a cell may have another cell adjacent to one of its edges. For example, cell 302 may have another cell to the right of right edge 306 of cell 302 in a design. Another cell may be placed to the left of left edge 308 of cell 302. Normally, the top edge (not shown) is the power edge and the bottom edge (not shown) is the grounding edge of a cell.

As an example, cell 302 has left edge 308 of a different color than right edge 306 (the different colors being depicted by different shading patterns). The shapes in cell 302 are colored using the two example colors. A stitch is a location where a shape of one color meets a shape of another color. Cell 302 includes five stitches 310. Generally, the higher the number of stitches in a double or multi-patterned cell design, the less desirable that cell design.

Cell 304 has right edge 312 and left edge 314 of the same colors as the corresponding right edge 306 and left edge 308 respectively of cell 302. However, by flipping the colors of the shapes within cell 304, the number of stitches 316 is reduced to three. Thus, under certain circumstances, when either cell 302 or cell 304 could be used in a design, cell 304 could be more desirable than cell 302.

A threshold minimum distance between same color adjacent edges exists when cells are placed adjacent to one another in a placement. For example, if a cell has a green right edge, a conflict arises when that first cell has to be placed adjacent to a second cell that has a green left edge. No such conflict arises when the first cell's green right edge is placed adjacent to, for example, a blue left edge of the second cell.

Figure 4:
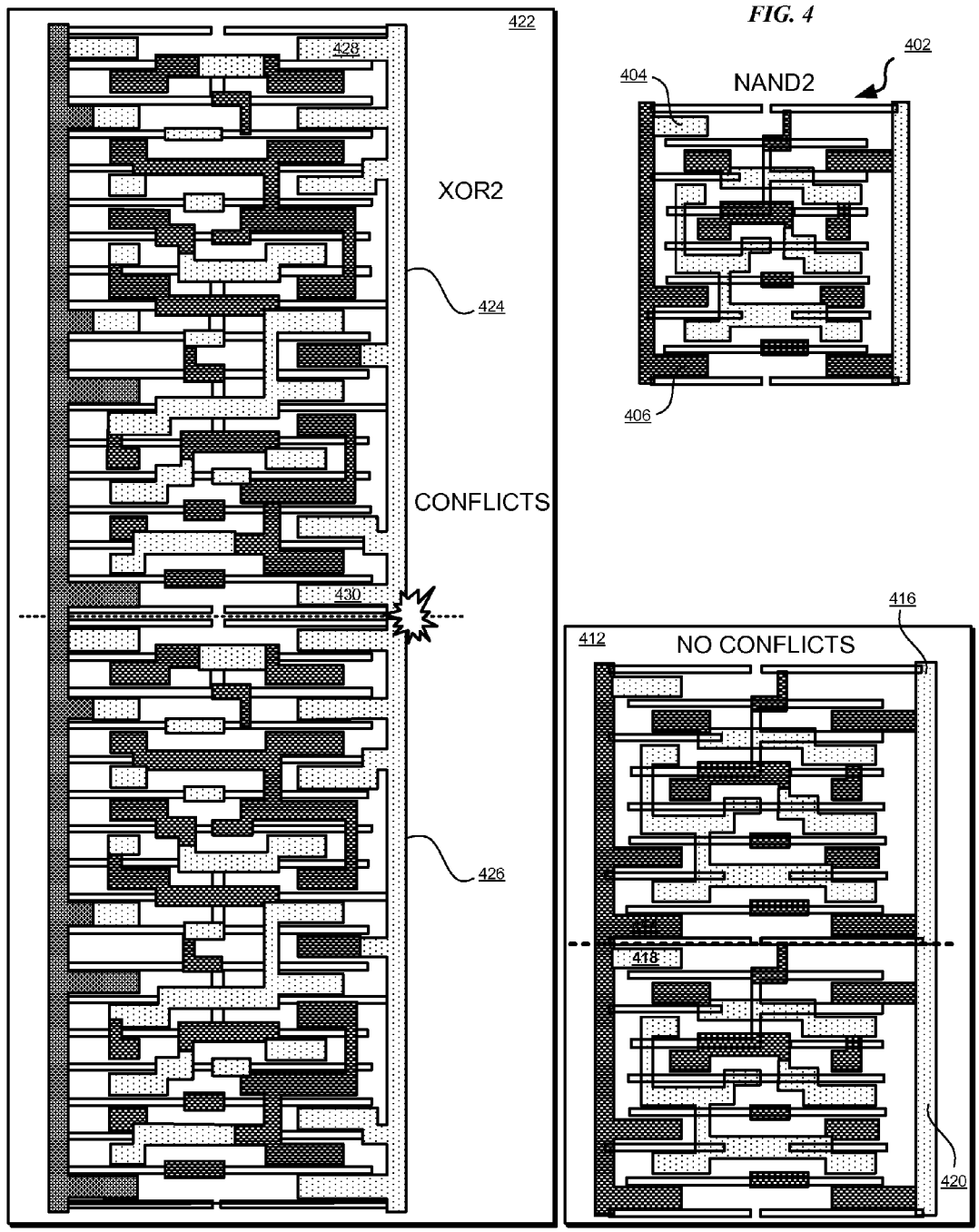
FIG. 4 depicts an example conflict condition in cell placement, which can be resolved using an illustrative embodiment.

With reference to FIG. 4, this figure depicts an example conflict condition in cell placement, which can be resolved using an illustrative embodiment. Cell 402 may be an example two-colored (double-patterned) NAND gate cell in a cell library of design tool 105 in FIG. 1.

Notice that left edge 404 is of a different color than right edge 406 (different colors are represented by different shading patterns in the black and white drawings). Two instances of cell 402 are placed adjacent to one another in placement 412. In placement 412, right edge 414 of cell 416 (a first instance of NAND cell 402) is adjacent to left edge 418 of cell 420 (a second instance of cell 402). Edges 414 and 418 are of different colors, as described with respect to edges 404 and 406 of cell 402. Because, edges 414 and 418 are of different colors, a conflict condition does not arise by placing two instances of cell 402 in placement 412.

Now consider placement 422, which places two copies of an XOR cell adjacent to one another. Cell 424 is one copy of an XOR cell and cell 426 is another copy of the XOR cell. The XOR cell, of which cells 424 and 426 are copies, has green left edge 428 and green right edge 430 (depicted by similar shading patterns in edges 428 and 430). Placing green right edge 430 adjacent to green left edge 432 creates a conflict condition in placement 422.

Presently, such conflicts are resolved by simply moving one or more of the conflicting cells to different locations in the design. More importantly, presently, such conflicts are not recognized until after the final placement, such as during the routing step of the design, and moving the conflicting cells at that phase in the design leads to other problems, such as increasing the design area, as described earlier. The illustrative embodiments describe how the placement phase of an IC design can be made MPL-aware, so that such conflicts can be recognized and resolved during the placement phase, and problems arising from late recognition of multi-patterned cell placement conflicts can be avoided or minimized.

With reference to FIG. 5, this figure depicts a block diagram of a pair-wise cost model that can be used in a placement tool to perform MPL-aware cell placements in accordance with an illustrative embodiment. For example, the pair-wise cost model can be structured as a pair-wise cost table. A placement tool in design tool 105 in FIG. 1 may be modified using such a pair-wise cost table according to an illustrative embodiment to form an MPL-aware placement tool. The MPL-aware placement tool may then perform MPL-aware cell placements. Using the pair-Wise cost table during an IC design.

Cells 502 and 504 may be any two different cells in a given cell library. Instance 512 may be a default instance of cell 502. Instance 522 may be a default instance of cell 504. A default instance of a cell is a copy/instance/version of the cell in which no particular coloring patterns are used. For example, a cell that is of a single color, such as before converting the cell design into a double or multi-patterned version, may be a default instance of the cell.

Instances 514, 516, 518, and 520 are instances of cell 502, each instance having a different combination of left and right edge colors. For example, instance 514 (RR) has the left and right edges both colored red; instance 516 (AG) has a red left edge and a green right edge; instance 518 (GR) has a green left edge and a red right edge; and instance 520 (GG) has the left and right edges both colored green.

Instances 524, 526, 528, and 530 are instances of cell 504, each instance having a different combination of left and right edge colors. For example, instance 524 (RR) has the left and right edges both colored red; instance 526 (RG) has a red left edge and a green right edge; instance 528 (GR) has a green left edge and a red right edge; and instance 530 (GG) has the left and right edges both colored green.

A cost function is defined for each combination of an instance of cell 502 adjacent to an instance of cell 504. In other words, for every two standard cell types in a cell library, all combinations of coloring options when they are adjacent are explored for the pair-wise cost model.

When in a pair of instances being considered, the instances of the adjacent cells cause edges of the same color to be adjacent to one another, a conflict condition exists, and the cost for that pair is set at a high threshold value. For example, instance 514 of cell 502 having a red right edge, when paired with instances 524 or 526 of cell 504 having red left edges, causes conflicts to arise in placement. Therefore, the pair-wise cost of cell pair 514-524 and 514-526 may be set to a high cost, for example, a maximum cost of 100, in the pair-wise cost model.

On the other hand, when there is no conflict between a pair, the pair-wise cost for that pair can be a low threshold value. For example, instance 514 of cell 502 having a red right edge, when paired with instances 528 or 530 of cell 504 having green left edges, does not cause conflicts in placement. Therefore, the pair-wise cost of cell pair 514-528 and 514-530 may be set to a low cost, for example, a minimum cost of 0, in the pair-wise cost model.

As a modification to the simplified cost model described above, the pair-wise costs of cell pairs can be further scaled or weighted using other considerations. For example, even when each of two cell pairs have no conflicts, one pair may be more desirable over another. For example, one cell instance in one pair may have fewer stitches than another instance of the same cell in the other pair, making the first pair more desirable over the other.

As another example, one cell instance in one pair may have a smaller area than another instance of the same cell in the other pair, making the first pair more desirable over the other. To factor in such variations and considerations, scaling factors can be used in conjunction with the pair-wise costs. For example, a pair-wise cost may be 0 (if no conflicts) plus α times number of stitches in one or both cell instances in the pair plus β times the area of one or both cell instances.

The number of stitches and area are described only as example scaling factors for scaling the pair-wise costs in a pair-wise cost model of an embodiment. Additionally, the multipliers α and β are used only as examples. Those of ordinary skill in the art will be able to conceive other scaling factors, multipliers, and multiplier values from this disclosure, and the same are contemplated within the scope of the illustrative embodiments.

Furthermore, when cells are not adjacent to one another, such that their edges will not be proximate to one another by less than a minimum distance threshold, a conflict condition generally does not exist. Furthermore, it is likely that several entries in the pair-wise cost model or table will share a common value.

Thus, the size of the pair-wise cost model (or pair-wise cost table if stored in a table form) according to an embodiment is of the order of the square of the number of cell types times the square of the number of color choices available in those cell types.

Table size=$O(T^2 * C^2)$

Where,

T=number of cell types, and

C=number of color choices.

Next, a cost of an overall tile is computed for a set of tile in a given design. A tile can include several cells, placed adjacent to one another. Depending on the number of cells in a given tile, the types of those cells, and the number of placement conflicts in the tile, the cost of a tile may vary from tile to tile in a given design.

As an example, the cast of a tile can be computed by totaling the pair-wise costs of all the cell pairs possible from the cells present in the tile. Consider for example, a tile T1 includes three cells—C1, C2, and C3. The cost of tile T1 can be the sum of the pair-wise costs of cell pairs C1-C2, C1-C3, and C2-C3.

The pair-wise cost model and the cost of placement tiles are then used for performing MPL-aware placement in the placement phase of an IC design in accordance with an embodiment. Particularly, the pair-wise cost model and the cost of placement tiles are used in a global phase and a local phase of MPL-aware placement, as described with respect to the subsequent figures.

With reference to FIG. 6, this figure depicts a flowchart of a process of defining the various costs to be considered in MPL-aware placement in accordance with an illustrative embodiment. Process 600 may be implemented in a modified IC design tool, such as in the combination of application 107 and design tool 105 in FIG. 1.

Process 600 begins by determining pair-wise costs of the various combinations of standard cells (step 602). In performing step 602, process 600 considers the cell, pairs that are possible from the differently colored instances of the various standard cells. Process 600 may also compute cell costs (not shown), such as the cost of a cell using the number of stitches in the cell, the area of the cell, and other factors. The cell costs can be used in defining the pair-wise costs in step 602.

Process 600 defines a cost for each tile in a set of tiles in the IC design, the tiles in the set including standard cells for which pair-wise cost is available from step 602 (step 604). Process 600 ends thereafter. In one embodiment, the tile cost considers the worst case scenario, and sums the maximum possible pair-wise cost for each cell pair in the tile. In another embodiment, the tile cost sums an average of the highest and the lowest pair-wise costs of each cell pair in the tile.

Figure 7:
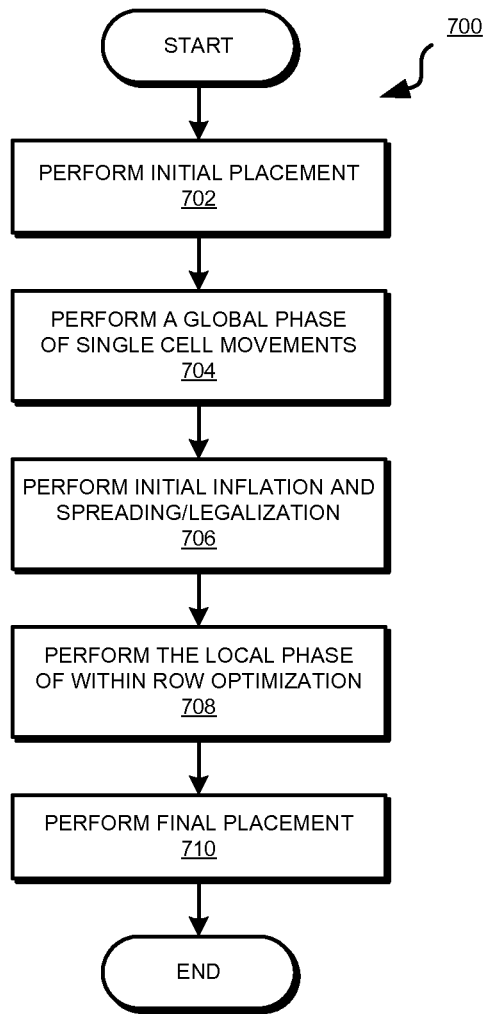
FIG. 7 depicts a flowchart of an overall process of an MPL-aware placement in an IC design in accordance with an illustrative embodiment.

With reference to FIG. 7, this figure depicts a flowchart of an overall process of an MPL-aware placement in an IC design in accordance with an illustrative embodiment. Process 700 can be implemented in a modified IC design tool, such as in the combination of application 107 and design tool 105 in FIG. 1.

Process 700 begins by performing an initial placement (step 702). Process 700 performs a global phase of cell movements using the initial placement (step 704). The details of the global phase are described with respect to FIG. 8.

Process 700 performs inflation, and spreading or legalization to perform the cell movement of step 704 (step 706). For example, to move a cell, the cell is artificially inflated in the design such that a placement solution becomes illegal and the placement tool has to relocate the cell to another location to legalize the design with the inflated cell.

Process 700 performs a local phase of cell movements following the global phase (step 708). In the global phase, a cell can be moved to any suitable location in the design, such as from one location in a tile to another location in the tile, from one tile to another, or from one row of tiles to another row of tiles in the design. In the local phase, the cell movements are restricted to, a row of cells in a tile. Thus, the local phase is a within-row optimization of cell placement. The details of the local phase are described with respect to FIGS. 9-12.

Process 700 performs a final placement (step 710). Process 700 ends thereafter. In one embodiment, process 700 may determine whether the placement solution reached after step 708 meets an acceptability criterion for the placement solution of the IC design. If the placement solution after step 708 does not meet the acceptability criterion, process 700 may return to step 704 and perform another iteration of steps 704, 706, and 708 using the placement solution reached after step 708 of the previous iteration. Process 700 may end when the placement solution after step 708 of some iteration meets the acceptability criterion.

Figure 8:
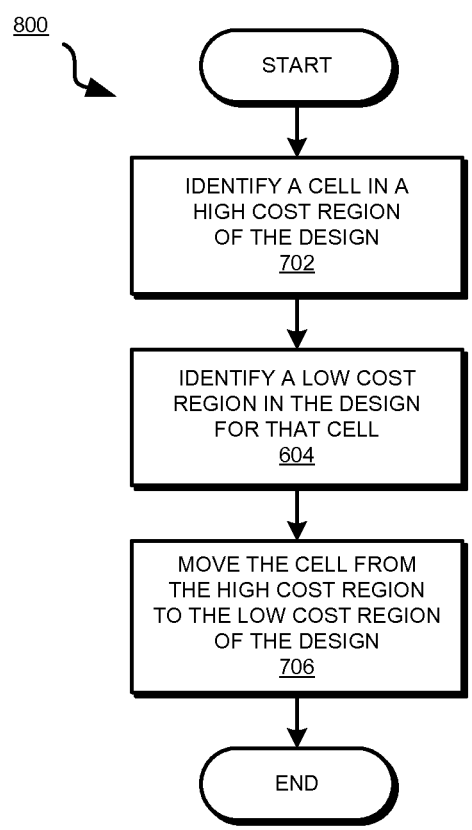
FIG. 8 depicts a flowchart of a global phase of an MPL-aware placement in an IC design in accordance with an illustrative embodiment.

With reference to FIG. 8, this figure depicts a flowchart of a global phase of an MPL-aware placement in an IC design in accordance with an illustrative embodiment. Process 800 can be implemented in a modified IC design tool, such as in the combination of application 107 and design tool 105 in FIG. 1.

In the global phase, process 800 identifies a cell in a high cost region of a given IC design placement solution (step 802). Process 800 identifies a low cost region in the placement solution (step 804). Process 800 moves the cell from the high cost region of the design to the low cost region of the design (step 806). Process 800 ends thereafter.

For example, in the global phase process 800 may move a cell from a tile whose tile cost is above a threshold to another tile whose tile cost is below the threshold in the design. One example way of performing the cell movement in the global phase is by artificially inflating the cell in the tile with higher than threshold so that the placement solution becomes illegal and the legalization removes the cell from the tile with higher than threshold to another location. In such an inflation and legalization process, such as in step 706 in FIG. 7, the cell is likely to move to a tile with lower than threshold cost because other tiles with higher than threshold costs also likely include inflated cells that make those tiles an illegal location to place the cell being moved.

Figure 9:
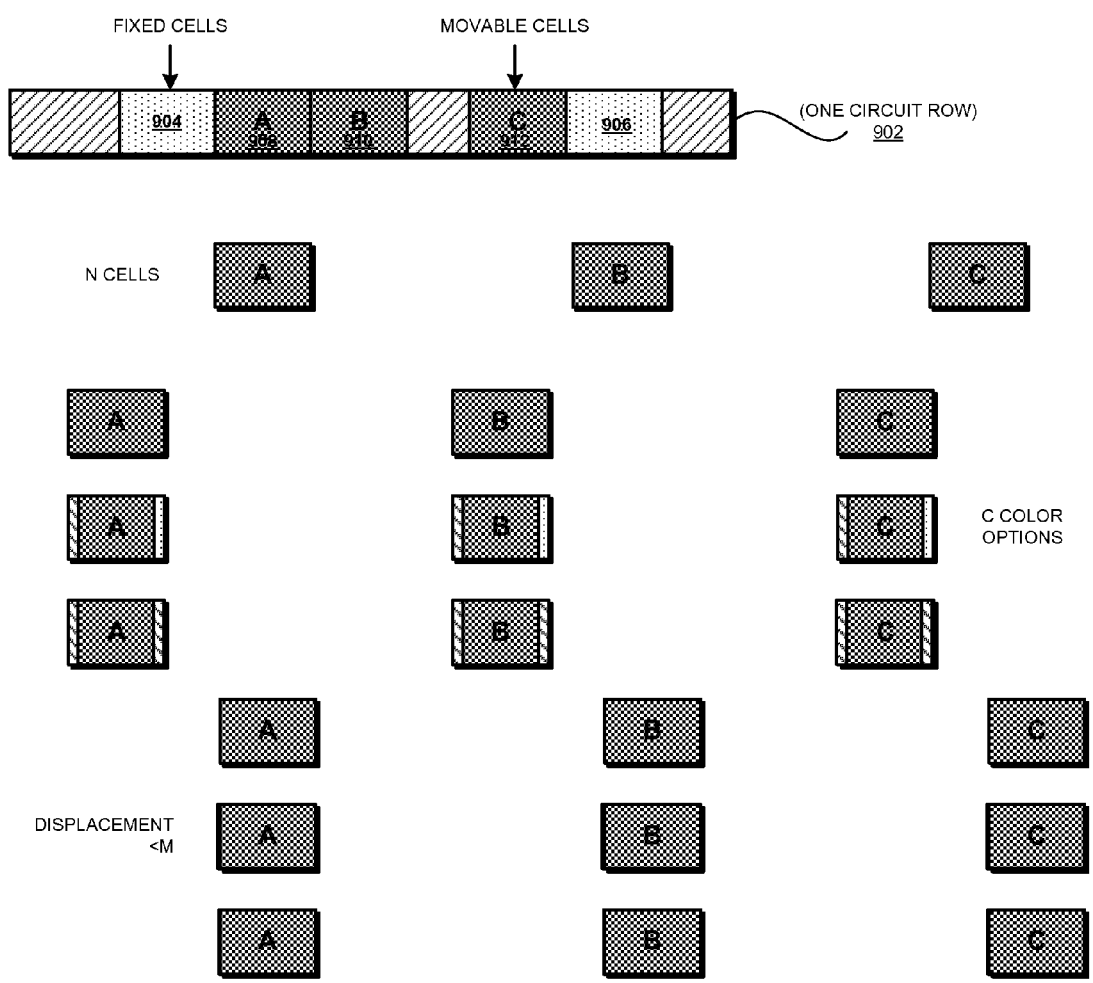
FIG. 9 depicts a block diagram of the cell movements in the local phase of the MPL-aware placement in accordance with an illustrative embodiment.

With reference to FIG. 9, this figure depicts a block diagram of the cell movements in the local phase of the MPL-aware placement in accordance with an illustrative embodiment. Row 902 may be an example single circuit row in a given placement, such as a placement resulting after the global phase of process 800 in FIG. 8 has been performed.

In the depicted example, row 902 includes fixed cells 904 and 906. Fixed cells 904 and 906 bound the movement of movable cells 908, 910 and 912, labeled cell "A", "B", and "C" respectively. As one part of the local phase according to an embodiment, cells A, B, and C are moved within the space between fixed cells 904 and 906, within row 902 to remove any conflicts.

As another part of the local phase according to the embodiment, the movement of cells A, B, and C is combined with changing the colors of the edges of cells A, B, and C to achieve a conflicts-free placement in row 902 after the local phase. In other words, suitable instances of cells A, B, and C are selected, having suitably colored edges so as not to place like-colored edges of adjacent cells within a threshold minimum separation distance of one another.

Thus, the local phase according to the embodiment is a combination of the movement within the row and selecting those instances of the cells being moved that form a conflicts-free combination of edges when the cells are moved and placed within the row. To understand this local phase according to an embodiment further, assume that there are N cells to be moved, as shown. Further assume that the N cells have C color options, as shown in this figure and as described earlier. Additionally, assume that the movement threshold is M, that is, the maximum movement can be M units. M may be suitably selected to minimize the timing impact of the cell movements.

Figure 10A:
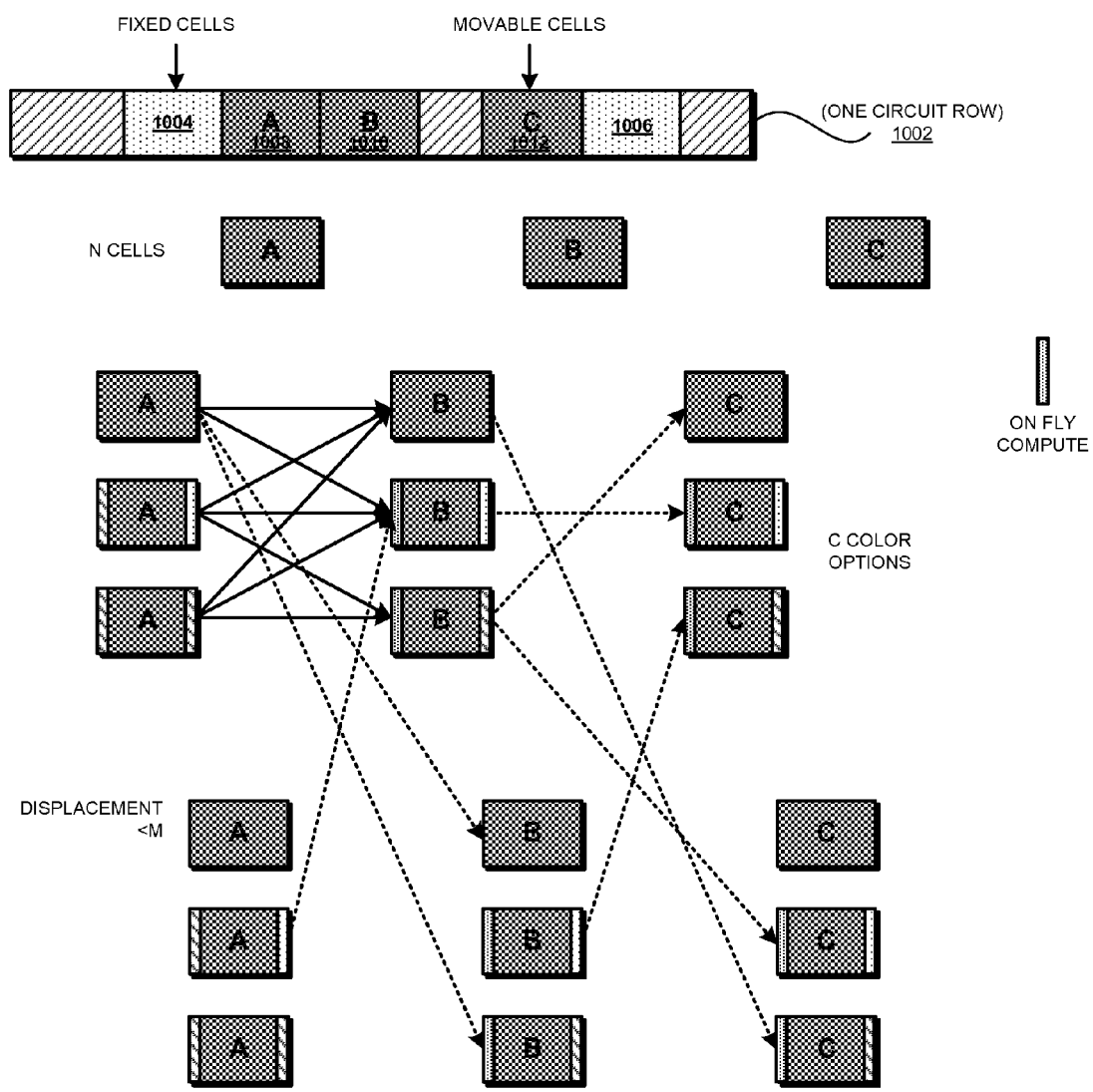
FIG. 10A depicts a smart pruning method used for reducing the complexity of the local phase in accordance with an illustrative embodiment.

With reference to FIG. 10A, this figure depicts a smart pruning method used for reducing the complexity of the local phase in accordance with an illustrative embodiment. Row 1002 and fixed cells 1004 and 1006 are analogous to row 902 and fixed cells 904 and 906 in FIG. 9. Movable cells 1008, 1010, and 1012 labeled "A", "B", and "C" respectively, are analogous to similarly labeled Movable cells 908, 910, and 912 in FIG. 9.

Simply minimizing the total cost is no guarantee that hot-spots with pair-wise cost exceeding a maximum threshold will not exist in row 1002. Therefore, an objective of the local phase is to find an optimal placement and coloring solution to minimize the maximum pair-wise cost in row 1002.

Using dynamic programming algorithm, the problem of N cells of C color Options, movable a maximum of M Units of distance is solvable in polynomial time. For example a prior art algorithm can build a directed acyclic graph (DAG) of order $(N*M^2*C^2)$ to solve this problem of minimizing the maximum pair-wise cost in row 1002. However, an embodiment can utilize smart pruning and reduce the complexity to order $(N*M*C^2)$, thereby advantageously improving the performance of the local phase. An algorithm suitable for this purpose is described with respect to FIG. 10B.

The smart pruning algorithm prunes the redundant solutions in the DAG by recognizing that the cost is monotone as cells move from one direction to the other, such as from left to right in the depicted figure. Therefore, the smart pruning algorithm of the local phase according to an embodiment only has to visit order (M) edges to find optimal solutions for each pair, instead of order $(M^2)$. Thus, the smart pruning algorithm of the local phase according to an embodiment is of order $(N*M*C^2)$ complexity, an advantageous improvement over the prior art dynamic programming algorithm for a similar purpose.

Some further reductions, though not impacting the complexity, will reduce the runtime in practice. This concept is depicted in FIG. 10A as follows. Each of cells A, B, and C can have five alternative instances with two color choices. For example, with red and green edge options for each cell, the five instances would be (i) the default instance, (ii) the RR instance where the left and the right edges are both red, (iii) RG instance where the left edge is red and the right edge is green, (iv) the GR instance where the left edge is green and the right edge is red, and (v) the GG instance where the left and the right edges are both red.

In computing a minimized maximum pair-wise cost solution, when cells A, B, and C are ordered as shown in row 1002, an exhaustive DAG for each cell pair would have 5*5 edges, i.e., 25 edges.

However, according to an embodiment, not all five instances of each cell need be considered for computing a minimized maximum pair-wise cost solution. Note that in an example left to right movement, what is to be considered is only the right edge of the cell and the right edge's combination to the possible left edges of the cell to the right. Therefore, the number of left side cells, as in graph portion 1014, reduces to three for each cell pair. For example, for cell A, the reduced graph need only consider the default instance, any one of the two instances with a red right edge, and any one of the two instances with a green right edge.

For cell B to the right of cell A, reduced graph portion 1014 need also only consider only the default instance, any one of the two instances with a red right edge, and any one of the two instances with a green right edge. As an example, the pair-wise cost of a cell pair where cell A has a red right edge and cell B has a green left edge will be the same regardless of whether cell B has a red right edge or a green right edge. Therefore, only the right edges are important in a right-to-left movement reduced DAG, and the left edges of cells. A, B, and C can be computed on the fly, as shown. In a left-to-right movement reduced DAG, only the left edges need be considered and the right edges can be computed on the fly in a similar manner. Thus, instead of considering 5*5=25 edges, now the reduced DAG considers only 3*3=9 edges.

This reduction, when considered in conjunction with the displacement threshold M further prunes the reduced DAG. When cells A, B, or C are moved to the right by M units, e.g., by a single routing track width, again only three instances out of the five possible need be considered for a two-color solution, as depicted in graph portion 1016. The DAG further reduces the number of edges that have to be considered while considering moving the cells and selecting color options.

The reduced DAG achieved by this smart pruning according to an embodiment only prunes redundant edges from an exhaustive DAG and does not sacrifice the accuracy of the solution found. Thus, the smart pruning according to an embodiment results in a dynamic programming algorithm that can determine the minimized maximum pair-wise cost local phase solution in a reduced amount of time.

With reference to FIG. 10B, this figure depicts a pseudo code of a smart pruning algorithm of reduced complexity in accordance with an illustrative embodiment. Algorithm 1050 can be used in the smart pruning method depicted in FIG. 10A.

The reduction in complexity and the resulting improvement in the speed of determining a solution is achieved for two main reasons. As for the first reason, a concept of inferior solutions is utilized as follows. Comparing to an existing location of cell A, if A is placed further to the right of the current location of A, and the maximum pair wise cost among A and all the cells on the left side of A is higher than (or equal to) the maximum pair wise cost among the original location of A and all the cells to the right of cell A, then it is apparent that moving cell A to the right is not advantageous because the cost of A and its right cell C will be higher, and the total maximum cost will only increase. The algorithm can therefore prune this solution from the possible solutions to explore. Therefore, when the original DAG edges are explored, as long as the maximum cost so far is greater than the cost between one location of A and one location of its right cell B in the left to right order of possible locations, the algorithm can stop iterating on further right locations of A as those solutions will be inferior.

As for the other reason, assume that the algorithm has computed an optimal solution (placement of cell A on the left of B) for the cell B placed at a certain location. When the algorithm tries to find the optimal solution when B is shifted one track to the right, the algorithm does not need to explore all possible locations of A again. Instead, the algorithm can start with the location of A that generates the best solution when B is placed at the original location, and then use that location of A to start to search the best location of A for the current position of B. This property is based oh the monotone property as well. At least for these two reasons, the algorithm depicted in FIG. 10B achieves the reduction in complexity and the resulting improvement in execution speed.

Figure 11:
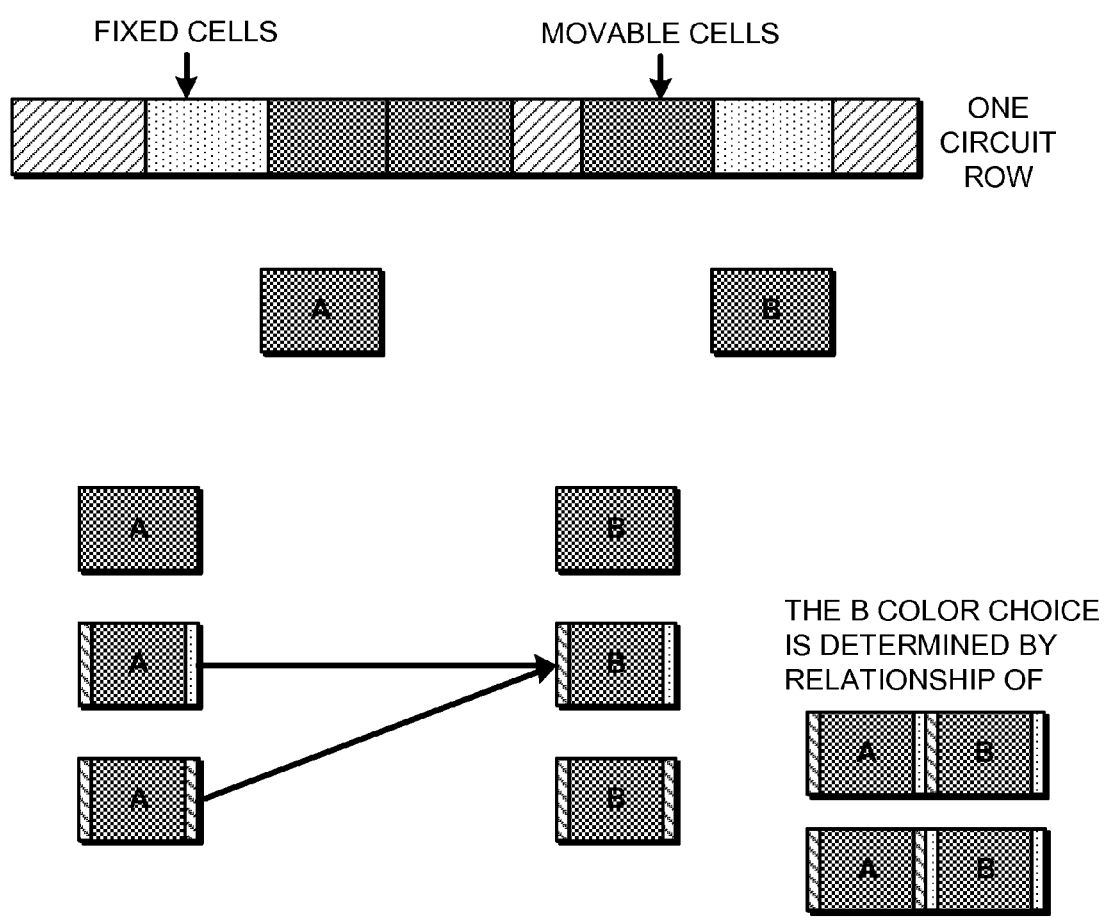
FIG. 11 depicts a block diagram of the smart pruning step in the local phase in accordance with an illustrative embodiment.

With reference to FIG. 11, this figure depicts a block diagram of the smart pruning step in the local phase in accordance with an illustrative embodiment. Row 1102 and fixed cells 1104 and 1106 are analogous to row 1002 and fixed cells 1004 and 1006 in FIG. 10. Movable cells 1108, 1110, and 1112 labeled "A", "B", and "C" respectively, are analogous to similarly labeled movable cells 1008, 1010, and 1012 in FIG. 10. Graph portion 1114 is a sub-portion of graph portion 1014 in FIG. 10, depicting only the relationship between cells A and B for the clarity of the depiction.

In graph portion 1114, the instance of B shown is an instance where cell B has a red right edge. When the pair-wise cost is computed with cell A having a red right edge, the instance of cell B having a green left edge is assumed on the fly in the computation. This assumption is valid because the instance of cell B with green left edge offers a lower pair-wise costs with the red right edge of cell A as compared to the instance of cell B with a red left edge—which would cause a conflict and consequently a high pair-wise cost. Similarly, When the pair-wise cost is computed with cell A having a green right edge, the instance of cell B having a red left edge is assumed on the fly in the computation because the instance of cell B with red left edge offers a lower pair-wise costs with the green right edge of cell A as compared to the instance of cell B with a green left edge.

Thus, all five instances of cell B need not be considered, as only one of them will offer a no-conflict pair with a given right edge of cell A. Thus, the smart pruning step of the local phase according, to an embodiment reduces the complexity of the dynamic programming algorithm without sacrificing the accuracy of the local phase solution.

Note that cells with only two color options are selected only as examples for the clarity of the description and not as a limitation on the embodiments. Any number of color options can be similarly pruned in a MPL implementation within the scope of the embodiments. Furthermore, only three cells are depicted and described as participating in the local phase only as an example for the clarity of the description. Any number of cells can similarly be included in a DAG that is reduced through the smart pruning concept described herein. A row bound by fixed cells is also depicted only as an example form of a row of cells. Any manner of identifying a raw of cells in a given placement is usable with an embodiment, and such rows are contemplated within the embodiments.

With reference to FIG. 12, this figure depicts a flowchart of a process of the local phase of the NFL-aware placement in accordance with an illustrative embodiment. Process 1200 can be implemented in a modified IC design tool, such as in the combination of application 107 and design tool 105 in FIG. 1.

Process 1200 begins by identifying, a cell having a conflict with another cell in the same row (step 1202). Process 1200 performs block 1204 using the dynamic programming algorithm including smart pruning as described with respect to FIG. 9-11. Within block 1204, as may be suitable, process 1200 may identify a new location (perform a movement) for the cell in the same row (step 1206). Process 1200 moves the cell to the identified new location (step 1208). Within block 1204 as well, as may be suitable, process 1200 may identify another color option for the cell identified in step 1202 (step 1210). Process 1200 replaces the cell with the identified color option (step 1212).

Process 1200 may repeat block 1204 until the maximum pair-wise cost of the cells in the row has been minimized, such as when no more conflict conditions exist in the row. Process 1200 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for multi-patterning lithography aware cell placement in integrated circuit design. Using an embodiment, conflicts between multi-colored cells can be resolved during the placement phase of an IC design process. Performing the conflicts removal during placement avoids additional problems associated with conflicts removal during routing or post-placement phases of the design process.

Furthermore, an embodiment performs the conflicts removal during placement using a two-phase process, which includes the global phase and the local phase. The local phase of the conflicts removal process is further optimized to consider both cell movement and cell color options together, and execute in smaller amount of time as compared to prior art dynamic programming algorithm.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RE, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the pretence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the use contemplated.

What is claimed is:

1. A computer implemented method for multi-patterning lithography (MPL) aware cell placement in integrated circuit (IC) design, the method comprising:
    performing, using an application executing using a processor and a memory in a data processing system, a global phase of cell movement of a color instance of a cell, wherein the color instance of the cell is used in the IC design from a plurality of different color instances available of the cell, wherein the global phase comprises moving the color instance of a cell from any first location in a first region the IC design to any second location in a second region the IC design, the first region having a first cost which is higher than a threshold cost and the second region having a second cost which is lower than the threshold cost, wherein the first cost is an indicator of a cumulative level of coloring conflicts between pairs of cells in the first region and the second cost is an indicator of a cumulative level of coloring conflicts between pairs of cells in the second region before moving the color instance of the cell; and
    performing a local phase cell movement, wherein the local phase comprises moving the color instance of the cell from a first location within a row of cells in the IC design to a second location within the row such that removing the color instance of the cell from the first location within the row and placing one of the plurality of different color instances available for the cell in the second location within the row removes a first coloring conflict between a first pair in the row without introducing a second coloring conflict between a second pair in the row, the first pair comprising the color instance of the cell and a second cell in the row, the second pair comprising the one of the plurality of different color instances available for the cell and a third cell in the row, wherein the global phase and the local phase are each performed before a final placement is produced for the IC design.

2. The computer implemented method of claim 1, wherein the moving comprises:
    considering a distance threshold for cell movement within the row;
    considering the plurality of color instances available for the cell; and
    determining the second location within the row for the cell and a color instance of the cell to occupy the second location in compliance with the distance threshold.

3. The computer implemented method of claim 2, wherein the moving minimizes a maximum pair-wise cost of cell pairs within the row.

4. The computer implemented method of claim 1, wherein the first region comprises a first tile in the IC design, wherein the first cost is a first sum of pair-wise costs of all cells present in the first tile, wherein the second region comprises a second tile in the IC design, and wherein the second cost is a second sum of pair-wise costs of all cells present in the second tile.

5. The computer implemented method of claim 4, wherein the first sum includes a maximum pair-wise cost for a cell pair in the first tile.

6. The method of claim 1, further comprising:
storing, in a repository, a level of coloring conflict between a pair of cells as a pair-wise cost of the pair of cells, wherein the pair-wise cost of the pair of cells is one of a plurality of pair-wise costs of a corresponding plurality of pairs of cells stored in the repository;
modifying the pair-wise cost of the pair of cells by a factor; and
using the modified pair-wise cost as one level of coloring conflict between the pair of cells in the first cost.

7. The method of claim 6, wherein the factor is based on one of (i) a number of stitches in one cell in the pair of cells, and (ii) a total number of stitches in the pair of cells.

8. The method of claim 6, wherein the factor is based on one of (i) an area of one cell in the pair of cells, and (ii) a total area in the pair of cells.

9. A computer usable program product comprising a computer usable storage device including computer usable code for multi-patterning lithography (MPL) aware cell placement in integrated circuit (IC) design, the computer usable code comprising:
computer usable code for performing, using an application executing using a processor and a memory in a data processing system, a global phase of cell movement of a color instance of a cell, wherein the color instance of the cell is used in the IC design from a plurality of different color instances available of the cell, wherein the global phase comprises moving the color instance of a cell from any first location in a first region the IC design to any second location in a second region the IC design, the first region having a first cost which is higher than a threshold cost and the second region having a second cost which is lower than the threshold cost, wherein the first cost is an indicator of a cumulative level of coloring conflicts between pairs of cells in the first region and the second cost is an indicator of a cumulative level of coloring conflicts between pairs of cells in the second region before moving the color instance of the cell; and
computer usable code for performing a local phase cell movement, wherein the local phase comprises moving the color instance of the cell from a first location-within a row of cells in the IC design to a second location within the row such that removing the color instance of the cell from the first location within the row and placing one of the plurality of different color instances available for the cell in the second location within the row removes a first coloring conflict between a first pair in the row without introducing a second coloring conflict between a second pair in the row, the first pair comprising the color instance of the cell and a second cell in the row, the second pair comprising the one of the plurality of different color instances available for the cell and a third cell in the row, wherein the global phase and the local phase are each performed before a final placement is produced for the IC design.

10. The computer usable program product of claim 9, wherein the moving comprises:
computer usable code for considering a distance threshold for cell movement within the row;
computer usable code for considering the plurality of color instances available for the cell; and
computer usable code for determining the second location within the row for the cell and a color instance of the cell to occupy the second location in compliance with the distance threshold.

11. The computer usable program product of claim 10, wherein the moving minimizes a maximum pair-wise cost of cell pairs within the row.

12. The computer usable program product of claim 9, wherein the first region comprises a first tile in the IC design, wherein the first cost is a first sum of pair-wise costs of all cells present in the first tile, wherein the second region comprises a second tile in the IC design, and wherein the second cost is a second sum of pair-wise costs of all cells present in the second tile.

13. The computer usable program product of claim 12, wherein the first sum includes a maximum pair-wise cost for a cell pair in the first tile.

14. The computer usable program product of claim 9, wherein the computer usable code is stored in a computer readable storage medium in a data processing system, and wherein the computer usable code is transferred over a network from a remote data processing system.

15. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

16. A data processing system for multi-patterning lithography (MPL) aware cell placement in integrated circuit (IC) design, the data processing system comprising:
a storage device including a storage medium, wherein the storage device stores computer usable program code; and
a processor, wherein the processor executes the computer usable program code, and wherein the computer usable program code comprises:
computer usable code for performing, using an application executing using a processor and a memory in a data processing system, a global phase of cell movement of a color instance of a cell, wherein the color instance of the cell is used in the IC design from a plurality of different color instances available of the cell, wherein the global phase comprises moving the color instance of a cell from any first location in a first region the IC design to any second location in a second region the IC design, the first region having a first cost which is higher than a threshold cost and the second region having a second cost which is lower than the threshold cost, wherein the first cost is an indicator of a cumulative level of coloring conflicts between pairs of cells in the first region and the second cost is an indicator of a cumulative level of coloring conflicts between pairs of cells in the second region before moving the color instance of the cell; and
computer usable code for performing a local phase cell movement, wherein the local phase comprises moving the color instance of the cell from a first location-within a row of cells in the IC design to a second location within the row such that removing the color instance of the cell from the first location within the row and placing one of the plurality of different color instances available for the cell in the second location within the row removes a first coloring conflict between a first pair in the row without introducing a second coloring conflict between a second pair in the row, the first pair comprising the color instance of the cell and a second cell in the row, the second pair comprising the one of the plurality of different color instances available for the cell and a third cell in the row, wherein the global phase and the local phase are each performed before a final placement is produced for the IC design.

17. The data processing system of claim 16, wherein the moving comprises:
   computer usable code for considering a distance threshold for cell movement within the row;
   computer usable code for considering the plurality of color instances available for the cell; and
   computer usable code for determining the second location within the row for the cell and a color instance of the cell to occupy the second location in compliance with the distance threshold.

18. The data processing system of claim 17, wherein the moving minimizes a maximum pair-wise cost of cell pairs within the row.

19. The data processing system of claim 16, wherein the first region comprises a first tile in the IC design, wherein the first cost is a first sum of pair-wise costs of all cells present in the first tile, wherein the second region comprises a second tile in the IC design, and wherein the second cost is a second sum of pair-wise costs of all cells present in the second tile.

20. The data processing system of claim 19, wherein the first sum includes a maximum pair-wise cost for a cell pair in the first tile.

\* \* \* \* \*